United States Patent
Suzuki

(10) Patent No.: US 8,248,904 B2
(45) Date of Patent: Aug. 21, 2012

(54) RECORDING AND REPRODUCING UNIT AND RECORDING AND REPRODUCING METHOD

(75) Inventor: Yuichi Suzuki, Kanagawa (JP)

(73) Assignee: Sony Corporation, Tokyo (JP)

(*) Notice: Subject to any disclaimer, the term of this patent is extended or adjusted under 35 U.S.C. 154(b) by 35 days.

(21) Appl. No.: 12/910,122

(22) Filed: Oct. 22, 2010

(65) Prior Publication Data

US 2011/0116350 A1    May 19, 2011

(30) Foreign Application Priority Data

Nov. 16, 2009    (JP) .................................. 2009-261090

(51) Int. Cl.
*G11B 7/00* (2006.01)

(52) U.S. Cl. .................. 369/84; 369/47.12; 369/124.03

(58) Field of Classification Search ............... 369/44.37, 369/53.1, 53.22, 47.1, 83, 47.16, 124.09, 369/47.12, 84, 124.03; 386/248

See application file for complete search history.

(56) References Cited

U.S. PATENT DOCUMENTS

| 5,493,548 A * | 2/1996 | Kamioka ....................... 386/222 |
| 6,678,227 B1 | 1/2004 | Kondo et al. |
| 7,362,692 B2 * | 4/2008 | Cookson et al. ........... 369/275.1 |

FOREIGN PATENT DOCUMENTS

| JP | 2006-107638 | 4/2006 |
| JP | 2007-89214 | 4/2007 |

* cited by examiner

*Primary Examiner* — Nabil Hindi
(74) *Attorney, Agent, or Firm* — Oblon, Spivak, McClelland, Maier & Neustadt, L.L.P.

(57) ABSTRACT

A recording and reproducing unit includes: a first optical head having at least one route of laser beam irradiation system that irradiates an optical disc recording medium with a laser beam; a second optical head having plural routes of laser beam irradiation systems that irradiate the optical disc recording medium with laser beams; and a control part that performs control of, while allowing the laser beam irradiation system that the first optical head has to execute recording of information in the optical disc recording medium, allowing the plural laser beam irradiation systems that the second optical head has to execute simultaneous reproducing of the information recorded in the optical disc recording medium.

10 Claims, 11 Drawing Sheets

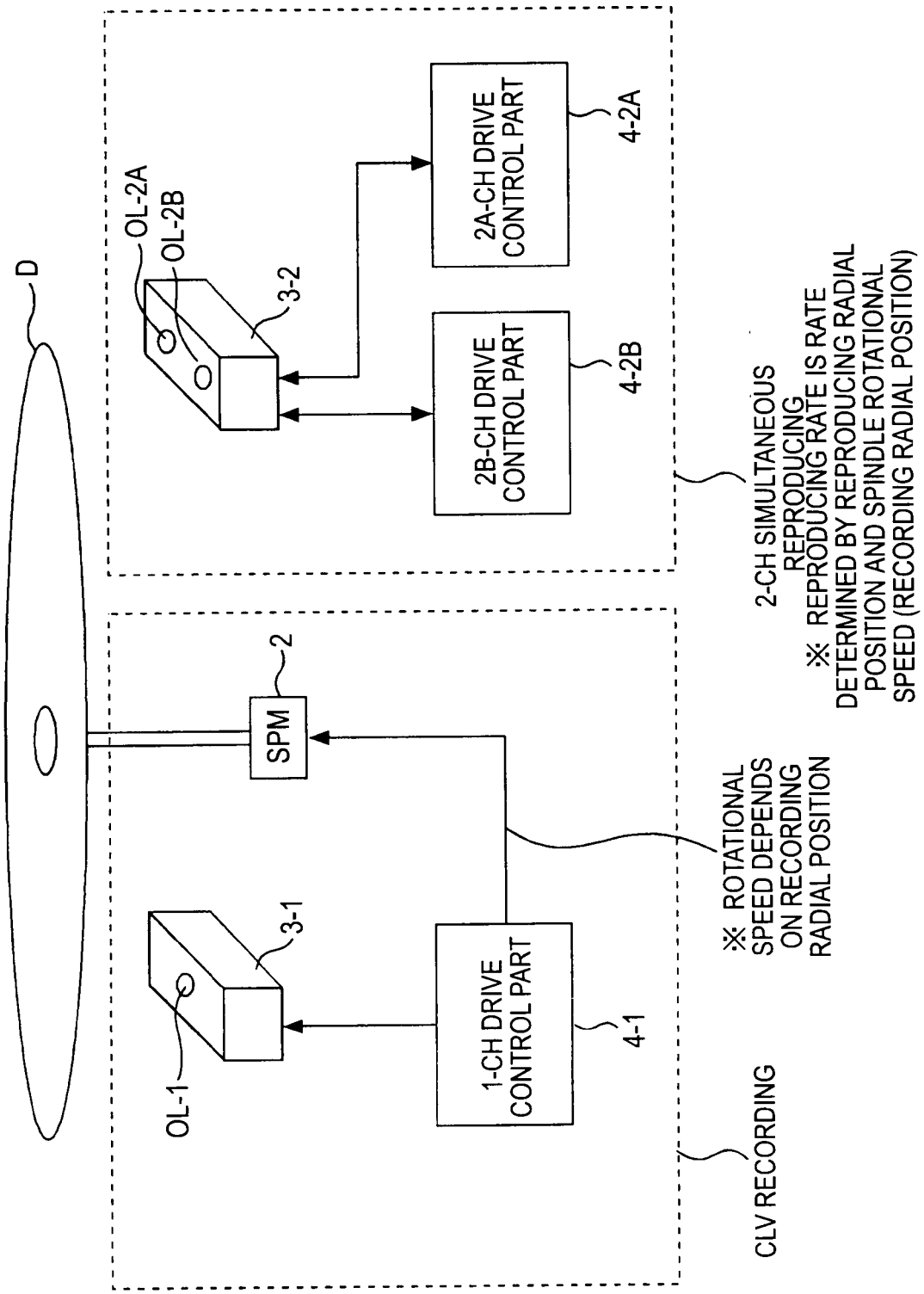

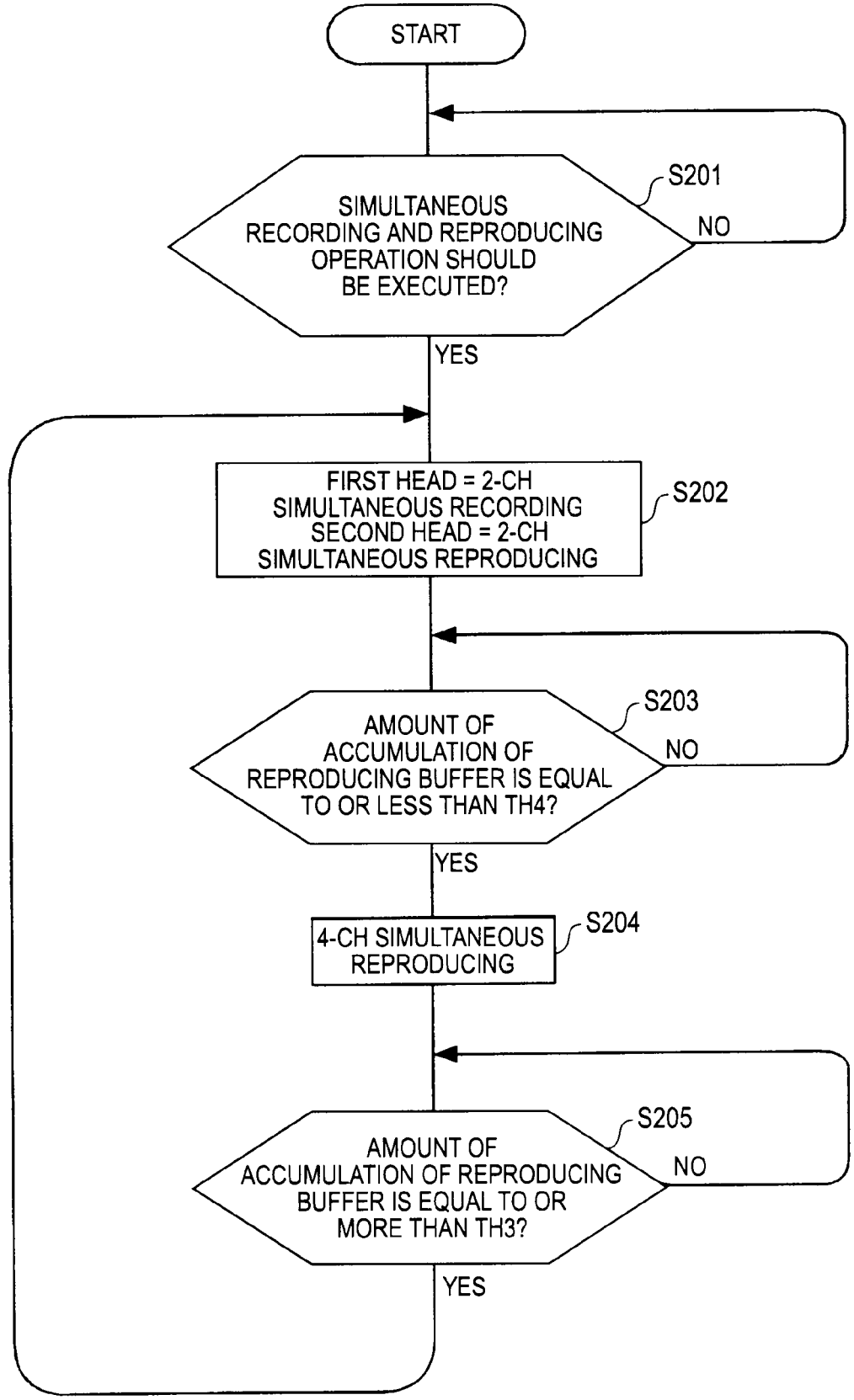

RECORDING AND REPRODUCING UNIT AND RECORDING AND REPRODUCING METHOD

BACKGROUND OF THE INVENTION

1. Field of the Invention

The present invention relates to a recording and reproducing unit that performs recording and reproducing on optical disc recording media on which recording/reproducing of information is performed by irradiation of light, specifically, to a recording and reproducing unit that has three or more independent laser beam irradiation systems (recording/reproducing channels) and performs information recording and information reproducing at the same time on the optical disc recording media and a method therefor.

2. Description of the Related Art

Optical disc recording media such as CD (compact disc), DVD (Digital Versatile Disc), and BD (Blu-ray Disc: Registered Trademark), for example, on which recording/reproducing of information is performed by irradiation of light are widely used, and further, recording and reproducing units that perform recording and reproducing on them (optical disc drive units) are widely used.

Here, for example, there is a recording and reproducing unit for optical discs applied to a drive unit for professional-use video camera equipment as disclosed in JP-A-2006-107638 (Patent Document 1).

In the field of the professional-use video camera equipment, it is desired that, during recording of imaged video data in amounted optical disc, an arbitrary part of video data that has already been recorded on the optical disc may be reproduced at the same time.

As one technique for realizing the simultaneous recording and reproducing, a technique disclosed in JP-A-2007-89214 (Patent Document 2) may be cited.

In Patent Document 2, a technology using only one typical optical head (optical head having only one route of laser beam irradiation system that irradiates an optical disc with a laser beam) to perform simultaneous recording and reproducing on an optical disc is disclosed.

As below, one route of laser beam irradiation system is referred to as "one channel (ch)", and the configuration of performing recording and reproducing using only one typical optical head as described above is referred to as "1-head/1-ch configuration".

SUMMARY OF THE INVENTION

However, in the case where simultaneous recording and reproducing is performed using the 1-head/1-ch configuration as disclosed in Patent Document 2, there are problems that seek operation is frequently caused and a buffer memory having relatively large capacity is necessary for securement of an amount of transferred data.

Further, in the case where the simultaneous recording and reproducing is performed using the 1-head/1-ch configuration, reduction of recording/reproducing performance such that the rate of the data to be recorded/reproduced may be restricted is unavoidable compared to the typical case where only recording or only reproducing is performed.

Here, in Patent Document 1 cited as above, a configuration including two optical heads is disclosed, that is, a 2-head/2-ch configuration.

In Patent Document 1, there is no direct description or suggestion, however, using the 2-head/2-ch configuration, simultaneous recording and reproducing may be performed by assigning one head to recording and the other head to reproducing, and such a configuration may solve the problems that occur in the case of using the above described 1-head/1-ch configuration of performing simultaneous recording and reproducing in Patent Document 2.

However, in the case where simultaneous recording and reproducing is performed using the 2-head/2-ch configuration, the following points should be considered.

Here, in the recording and reproducing unit for optical disc, in the case where a constant recording/reproducing rate is requested, the CLV (constant linear velocity) scheme may be employed as a disc rotation control scheme. Especially, in the case of the above described recording and reproducing unit applied to video camera equipment, video data needing a constant recording/reproducing rate is used as target data of recording and reproducing, and recording/reproducing using the CLV is desired.

In the case where the CLV is employed, the rotational speed of an optical disc during recording is determined in response to the recording radial position. On this account, when simultaneous recording and reproducing is performed using the CLV, in the case where the inner circumference side is reproduced during recording at the outer circumference side, the reproducing rate is significantly reduced. Specifically, in the case of BD, for example, the innermost circumference of the optical disc is defined as 24 mm and the outermost circumference is defined as 58 mm, and therefore, the reproducing rate in the worst case where the innermost circumference is reproduced during recording of the outermost circumference is reduced to 1/2.4 as a ratio to the recording rate.

In this regard, the recording rate corresponds to the recording speed (the speed many times higher). That is, the recording rate is determined how many times higher the speed of recording an optical disc as a target of recording can withstand (that is, depending on the recording property that the optical disc has).

Here, depending on the standards of the recording and reproducing system, the rate of data to be recorded may be very close to the settable maximum recording rate. Specifically, under present circumstances, in the standards of a professional-use video camera system using a high-density disc like BD as a target of recording and reproducing, for example, the rate of video data is about 60 Mbps and the settable maximum recording rate is about 72 Mbps.

As described above, in the case where the settable maximum recording rate is close to the rate of the data to be recorded, even if simultaneous recording and reproducing is performed using the 2-head/2-ch configuration as in Patent Document 1, it may be impossible to maintain the condition that the reproducing rate is equal to or more than 100% of the recording rate on the entire surface of the disc.

That is, to realize simultaneous recording and reproducing on the entire disc surface of reproducing data in an arbitrary position on the disc during recording of data, it is necessary that the reproducing rate is equal to or more than the recording rate even in the case where the reproducing rate is significantly reduced relative to the recording rate because of the above described relation between the recording position and the reproducing position (the case where the inner circumference part is reproduced during recording of the outer circumference part). However, if the rate of data to be recorded is very close to the settable maximum recording rate, it maybe impossible to improve the reproducing rate according to a technique using the head in charge of recording of the two heads intermittently for reproducing (i.e., the technique as in Patent Document 2). Accordingly, in the case where the inner circumference part is reproduced during recording of the outer circumference part as described above, it may be impossible to make recording rate≦reproducing rate, and, as a result, it may be impossible to realize simultaneous recording and reproducing on the entire disc surface.

Thus, it is desirable to realize simultaneous recording and reproducing on an entire disc surface even under the condition that CLV recording is performed and a rate of data to be recorded is very close to the settable maximum recording rate.

According to an embodiment of the invention, there is provided a recording and reproducing unit having the following configuration.

That is, the unit includes a first optical head having at least one route of laser beam irradiation system that irradiates an optical disc recording medium with a laser beam.

Further, the unit includes a second optical head having plural routes of laser beam irradiation systems that irradiate the optical disc recording medium with laser beams.

Furthermore, the unit includes a control part that performs control of, while allowing the laser beam irradiation system that the first optical head has to execute recording of information in the optical disc recording medium, allowing the plural laser beam irradiation systems that the second optical head has to execute simultaneous reproducing of the information recorded in the optical disc recording medium.

According to the embodiment of the invention, regarding the laser beam irradiation systems of irradiating the optical disc recording medium with laser beams (recording/reproducing channels), the system in charge of recording may be one route and the systems in charge of reproducing may be plural routes. Thereby, in the case where the CLV (constant linear velocity) scheme is employed as a disc rotation control scheme and the rate of data to be recorded is very close to the settable maximum recording rate (the case where it may be impossible to employ a technique of using the channel in charge of recording intermittently for reproducing), the reproducing rate may be improved (a region where recording rate≦reproducing rate may be increased), and simultaneous recording and reproducing on the entire disc surface that may be impossible to be realized in the case of a relationship of recording channel:reproducing channel=1:1 can be realized.

As described above, according to the embodiment of the invention, even in the case where the CLV scheme is employed as the disc rotation control scheme and the rate of data to be recorded is very close to the settable maximum recording rate, the reproducing rate may be improved and simultaneous recording and reproducing on the entire disc surface that may be impossible to be realized in the case of the relationship of recording channel:reproducing channel=1:1 can be realized.

BRIEF DESCRIPTION OF THE DRAWINGS

FIG. 2 is a diagram for explanation of a simultaneous recording and reproducing technique as the first embodiment.

FIG. 11 is a flowchart showing a specific procedure of processing to be executed for realization of assignation of recording/reproducing channels in the case of the second technique of the second embodiment.

DESCRIPTION OF PREFERRED INVENTION

As below, the best mode for implementing the invention (hereinafter, referred to as embodiments) will be explained.
The explanation will be made in the following order.
<1. First Embodiment>
[1-1. Overall configuration of optical disc drive unit]
[1-2. Simultaneous recording and reproducing technique of first embodiment]
[1-3. Summary of first embodiment]
<2. Second Embodiment>
[2-1. Overall configuration of optical disc drive unit]
[2-2. Simultaneous recording and reproducing technique of second embodiment]

3. MODIFIED EXAMPLES

<1. First Embodiment>
[1-1. Overall Configuration of Optical Disc Drive Unit]

Figure 1:
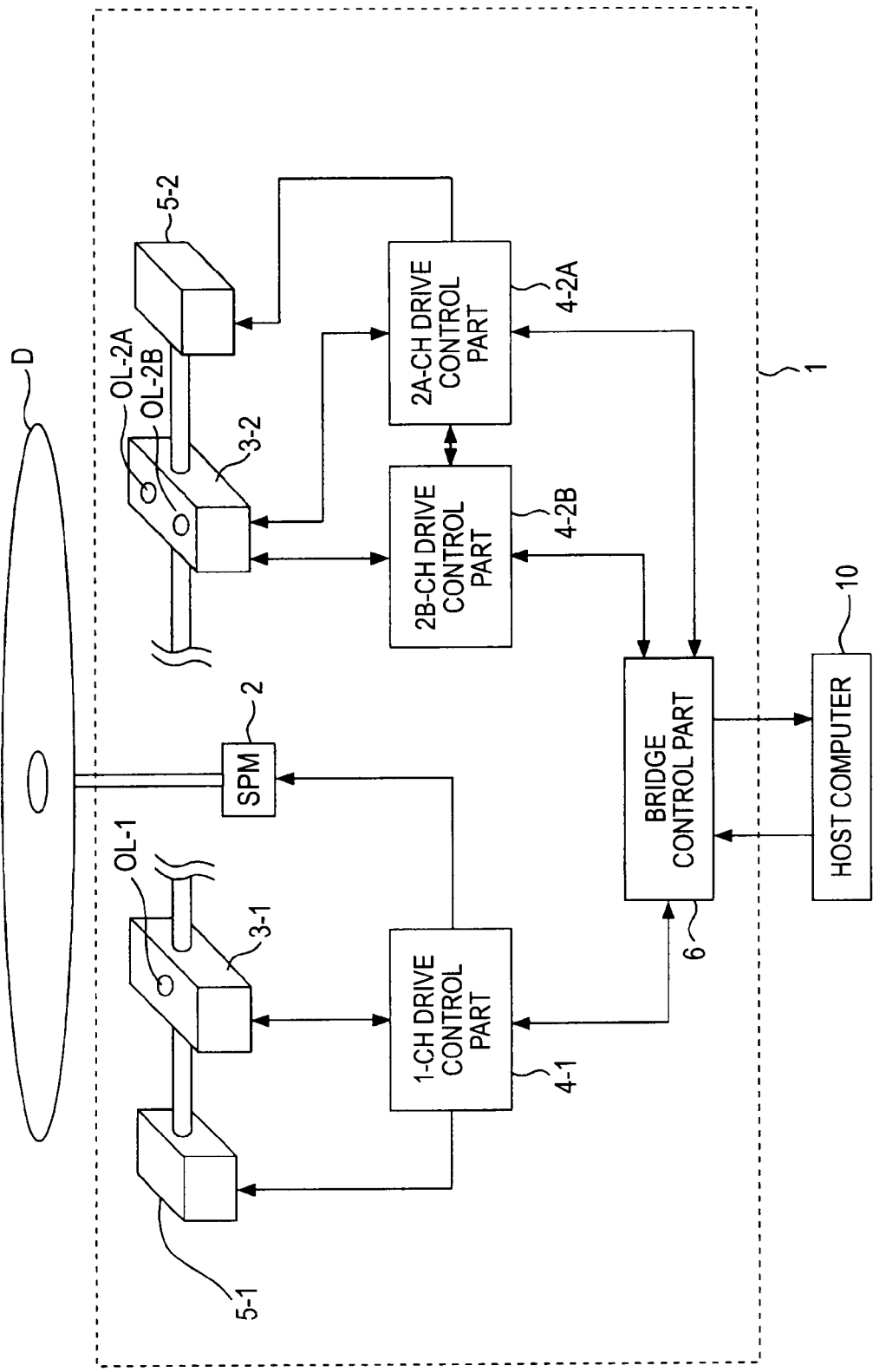
FIG. 1 is a diagram for explanation of an overall configuration within a recording and reproducing unit as the first embodiment.

FIG. 1 is a diagram for explanation of an overall configuration within an optical disc drive unit 1 as the first embodiment, one embodiment of the recording and reproducing unit according to the invention.

Here, in the following explanation, one route of laser beam irradiation system that irradiates an optical disc medium with a laser beam is referred to as one channel (recording/reproducing channel).

The optical disc drive unit 1 of the first embodiment includes two optical heads (3-1, 3-2 in the drawing), and one optical head has one laser beam irradiation system and the other optical head has two laser beam irradiation systems. Such a configuration is referred to as "2-head/3-ch configuration".

Hereinafter, "channel" is also referred to as "ch".

In FIG. 1, an optical disc D is an optical disc recording medium such as CD (compact disc), DVD (Digital Versatile Disc), and BD (Blu-ray Disc: Registered Trademark), for example, on which recording/reproducing of information is performed by irradiation of light. In this example, the optical disc D is compliant with standards of BD and recording and reproducing of information is performed under the condition that wavelength λ of laser beam is about 405 nm, numeric aperture NA of objective lens is about 0.85.

Here, though the explanation using graphic illustration is omitted, the optical disc drive unit 1 in this example is provided for video camera equipment that performs recording and reproducing of imaged video data on the optical disc D.

The optical disc D mounted on the optical disc drive unit 1 is set on a turn table (not shown) and rotationally driven by a spindle motor (SPM) 2 in the drawing.

In the embodiment, as a rotational drive scheme of the optical disc D, the CLV (constant linear velocity) scheme is employed.

As a configuration of irradiating the optical disc D rotationally driven in the CLV scheme with a laser beam for recording/reproducing, a first optical head 3-1 and a second optical head 3-2 in the drawing are provided.

In the case of the embodiment, the first optical head 3-1 and the second optical head 3-2 are located in a positional relationship in which they are opposed to each other with the center of the mounted optical disc D in between.

Within the first optical head 3-1, only one route of optical system for irradiating the optical disc D with a laser beam via an objective lens OL-1 in the drawing is provided. Though not shown, within the optical system, a laser diode as a light source of the laser beam and a photodetector for receiving reflected light from the optical disc D are provided, and various lenses and optical devices for guiding the laser beam output from the laser diode to the objective lens OL-1 and guiding the reflected light from the optical disc D to the photodetector via the objective lens OL-1 are formed. Further, a biaxial actuator that movably holds the objective lens OL-1 in a tracking direction (the radial direction of the optical disc D) and a focus direction (the direction toward or away from the optical disc D) is also provided.

Further, within the second optical head 3-2, two optical systems of an optical system that irradiates the optical disc D with a laser beam via an objective lens OL-2A in the drawing and an optical system that irradiates the disc with a laser beam via an objective lens OL-2B in the drawing are independently provided.

These optical systems are formed within the second optical head 3-2 so that the objective lenses OL-2A and OL-2B that they have are located in positions shifted in the circumferential direction of the optical disc D (the direction orthogonal to the radial direction in the disc plane) as shown in the drawing.

In the second optical head 3-2, each optical system has a laser diode, a photodetector, and a biaxial actuator like the optical system that the first optical head 3-1 has, and is adapted to irradiate the optical disc D with a laser beam and receive reflected light from the optical disc D.

Here, hereinafter, the channel of performing laser beam irradiation via the objective lens OL-1 that the first optical head 3-1 has is referred to as "1-ch".

Similarly, at the second optical head 3-2 side, the channel of performing laser beam irradiation via the objective lens OL-2A is referred to as "2A-ch", and the channel of performing laser beam irradiation via the objective lens OL-2B is referred to as "2B-ch".

The first optical head 3-1 is held to be slidably transported by a first slide transport part 5-1 as shown in the drawing. Further, the second optical head 3-2 is held to be slidably transported by a second slide transport part 5-2.

In the first slide transport part 5-1, a mechanical mechanism part that holds the first optical head 3-1 to be slidably transported in the radial direction of the optical disc D and a slide motor that drives the mechanical mechanism part are provided, and, when the slide motor is drive-controlled based on a control signal (slide drive signal) output from a 1-ch drive control part 4-1, which will be described later, the first optical head 3-1 is slidingly transported in the radial direction.

Similarly, in the second slide transport part 5-2, a mechanical mechanism part that holds the second optical head 3-2 to be slidably transported in the radial direction of the optical disc D and a slide motor that drives the mechanical mechanism part are provided, and, when the slide motor is drive-controlled based on a control signal output from a 2A-ch drive control part 4-2A, which will be described later, the second optical head 3-2 is slidingly transported in the radial direction.

Further, in the optical disc drive unit 1, in order that the respective channels can independently perform recording/reproducing, the respective drive parts of the 1-ch drive control part 4-1, the 2A-ch drive control part 4-2A, and a 2B-ch drive control part 4-2B are provided.

Each of these drive control parts comprehensively shows a configuration for independently performing recording and/or reproducing based on a light reception signal from the photodetector in each channel, including a servo control system based on the light reception signal from the photodetector provided in the optical system of the corresponding channel, a light emission drive system of the laser diode, a control part of a microcomputer or the like, for example, that makes control of them, etc.

Here, as will be described later, in this example, "1-ch" is used exclusively for recording, and "2A-ch" and "2B-ch" are used exclusively for reproducing.

Accordingly, as the 1-ch drive control part 4-1, a configuration for data reproduction based on the light reception signal from the photodetector (data reproducing processing system) is omitted.

Further, regarding the 2A-ch drive control part 4-2A and the 2B-ch drive control part 4-2B, a configuration for driving the laser diode to emit light in response to recording data (data recording processing system) is omitted.

Further, in the optical disc drive unit 1, a bridge control part 6 that overall-controls the 1-ch drive control part 4-1, the 2A-ch drive control part 4-2A, and the 2B-ch drive control part 4-2B is provided.

The bridge control part 6 includes a microcomputer, for example, and performs control of the 1-ch drive control part 4-1, the 2A-ch drive control part 4-2A, and the 2B-ch drive control part 4-2B so that reproduction of data instructed from a host computer 10 provided outside of the optical disc drive unit 1 and recording of data transferred from the host computer 10 side may be performed.

The specific control processing performed by the bridge control part 6 in the embodiment will be described later.

[1-2. Simultaneous Recording and Reproducing Technique of First Embodiment]

FIG. 2 is a diagram for explanation of a simultaneous recording and reproducing technique as the first embodiment realized by the optical disc drive unit 1 shown in FIG. 1.

As shown in FIG. 2, in the first embodiment, while recording in the optical disc D is performed by "1-ch" that the first optical head 3-1 has, data recorded in the optical disc D is simultaneously reproduced by the 2A-ch and the 2B-ch that the second optical head 3-2 has. That is, on the optical disc ID, simultaneous recording and reproducing by 1-ch recording and 2-ch simultaneous reproducing is performed.

Here, as described above, in the example, the CLV scheme is employed as the disc rotation control scheme, and the recording operation by the 1-ch is CLV recording. In this regard, the 1-ch drive control part 4-1 controls the rotational speed (number of revolutions) of the spindle motor 2 so that the recording linear velocity may be constant in response to the current recording position (radial position) on the optical disc D.

Note that, in the case where simultaneous recording and reproducing of, during recording of data in the optical disc D in a certain channel, performing data reproduction in another channel is performed as described above, the number of revolutions of the optical disc D is controlled to be the number in response to the recording radial position.

Here, depending on the second optical head 3, simultaneous reproducing using the 2A-ch and the 2B-ch is performed in the above described manner, and an example of a specific technique for 2-ch simultaneous reproducing by the 1-head/2-ch configuration will be explained with reference to FIGS. 3A to 3D.

In the respective drawings of FIGS. 3A to 3D, plural tracks spirally formed on the optical disc D arranged in the radial direction are schematically shown. Here, for convenience of illustration, only twelve tracks, track 1 to track 12 are extracted and shown as the plural tracks arranged in the radial direction.

Further, in the respective drawings of FIGS. 3A to 3D, a beam spot at the A-ch side (beam spot of the laser beam applied via the objective lens OL-2A) and a beam spot at the B-ch side (beam spot of the laser beam applied via the objective lens OL-2B) formed on the optical disc D are also shown.

These beam spot at the A-ch side and beam spot at the B-ch side move in the circumferential direction in the drawing with the rotational drive of the optical disc D and, when tracking servo control is performed, their positions follow the tracks, and thereby, the spots sequentially move from the inner circumference side to the outer circumference side. In FIGS. 3A to 3D, the process in which reproducing of information from the optical disc D is performed by the respective beam spots sequentially moving toward the outer circumference side with time is schematically shown.

Though not reflected in FIGS. 3A to 3D, the objective lenses OL-2A and OL-2B are located in positions shifted in the circumferential direction as described above, and thus, the position of the beam spot at the A-ch side and the position of the beam spot at the B-ch side are shifted in the circumferential direction of the drawings.

Figure 3A:
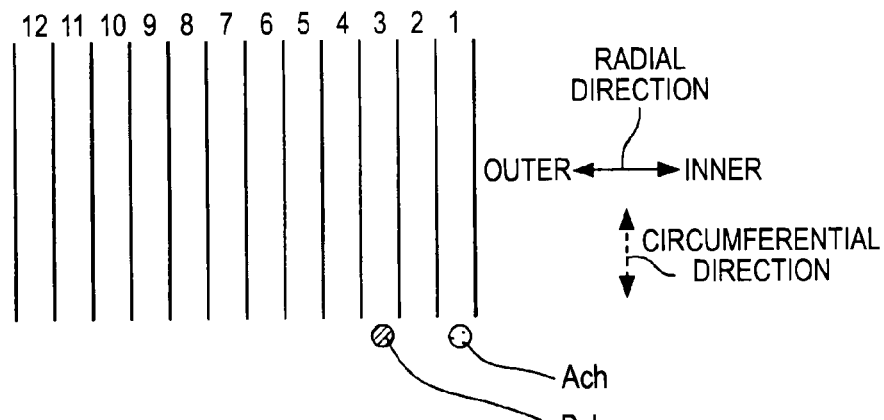
FIGS. 3A to 3D are diagrams for explanation of a specific technique for realization of 2-ch simultaneous reproducing (or recording).

First, in FIG. 3A, the location relationship between the beam spots at the A-ch side and the B-ch side at the start of reproducing is shown. As shown in the drawing, at the start of reproducing, it is assumed that the beam spot at the A-ch side is located at the inner circumference side and the position of the beam spot at the B-ch side is located at the outer circumference side. Further, here, for convenience of illustration, it is assumed that the spaced distance between the A-ch side and the B-ch side corresponds to two tracks.

Figure 3B:
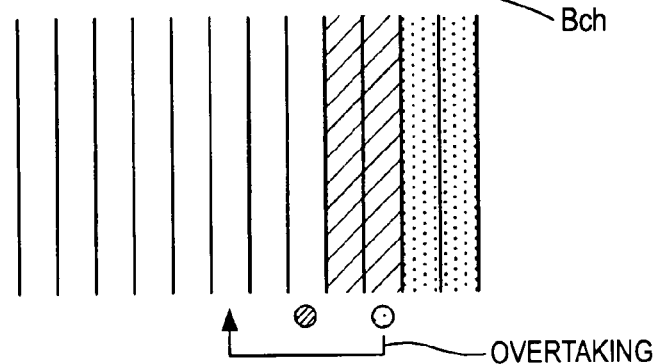

On the assumption, as shown in FIG. 3B, at the time when reproducing for two tracks is performed, the beam spot at the A-ch side reaches the track on which reproducing has already been performed by the beam spot at the B-ch side (track 3 in the drawing).

Accordingly, as shown in FIG. 3B, the beam spot position at the A-ch side is proactively moved toward the outer circumference side in consideration of the region that would be reproduced by the beam spot at the B-ch side (overtaking movement). Here, since the distance between the A-ch side and the B-ch side corresponds to two tracks, as shown in the drawing, the beam spot position at the A-ch side is moved to track 7 spaced apart by two tracks from track 5 in which the beam spot at the B-ch side is located at the time.

Figure 3C:
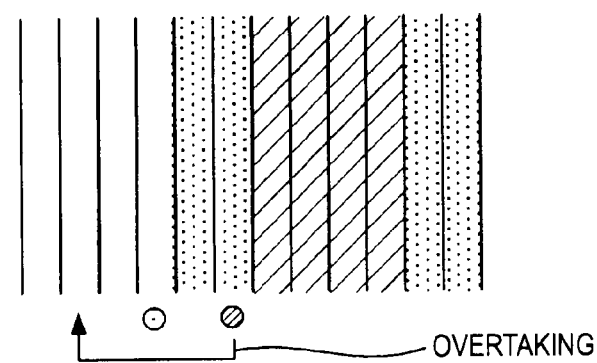

Further, when reproducing for two tracks is further performed after the overtaking is completed, as shown in FIG. 3C, on the contrary, the beam spot position at the B-ch side reaches the track (track 7) on which reproducing has already been performed by the beam spot at the A-ch side.

Therefore, in the same manner, the beam spot position at the B-ch side is overtaking-moved to the position at the outer circumference side in consideration of the region that would be reproduced by the beam spot at the A-ch side. Specifically, in this case, as shown in the drawing, the beam spot position at the B-ch side is moved to track 11 spaced apart by two tracks from track 9 in which the beam spot at the A-ch side is located at the time.

Figure 3D:
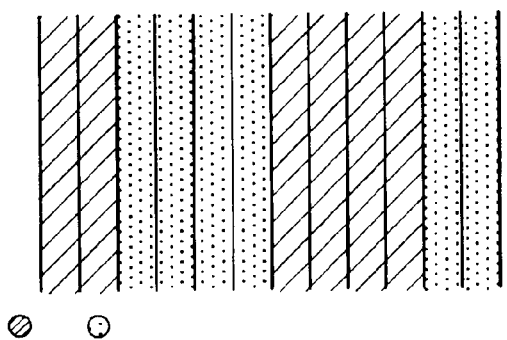

FIG. 3D shows the difference between the regions respectively reproduced by the A-ch side and the B-ch side with alternate overtaking at the A-ch side and the B-ch side.

Here, in FIGS. 3A to 3D, the example in which the distance between the beam spot at the A-ch side and the beam spot at the B-ch side corresponds to two tracks has been cited, however, in practice, for reduction of the number of times of overtaking or the like, the positions where the respective beam spots are located are spaced by the larger number of tracks. Note that, if the distance between the respective beam spots is set excessively larger, the error of the linear velocity also becomes excessive, and it should be set in consideration of the point.

Returning to FIG. 2, the 2A-ch drive control part 4-2A, and the 2B-ch drive control part 4-2B operate so that 2-ch simultaneous reproducing with the above described sequential overtaking of the respective beam spots may be realized based on the control from the bridge control part 6 shown in FIG. 1.

The processing performed by the bridge control part 6 in the embodiment for realization of the 2-ch simultaneous reproducing will be described later.

Here, as shown in the drawing, the reproducing rate in this case is a rate determined by the radial position where reproducing is performed and the spindle rotational speed (i.e., recording radial position). That is, the reproducing operation at the second optical head 3-2 side is performed during the time that recording is performed with the constant linear velocity at the first optical head 3-1 as described above, and the reproducing rate is a rate determined by the reproducing radial position and the recording radial position.

And now, when the above described 2-ch simultaneous reproducing is performed, how to perform the slide servo control of the optical heads based on the light reception signals respectively obtained in the two channels is problematic.

Here, when the slide servo control is performed, a slide error signal is generated by extracting the low-frequency component of the tracking servo signal, and the slide transport part is drive-controlled by the servo signal based on the slide error signal. If the slide servo of the optical heads is performed based on the slide error signal of only one of the A-ch and the B-ch, the position of the objective lens OL of the other channel is constantly shifted from the center position and the reproducing performance in the other channel is remarkably deteriorated.

Accordingly, in the embodiment, the slide servo control for the second optical head 3-2 that performs 2-ch simultaneous reproducing is performed based on a signal obtained by averaging the slide error signal at the A-ch side and the slide error signal at the B-ch side.

Specifically, the slide error signal generated from the tracking servo signal generated at the 2A-ch side and the slide error signal generated from the tracking servo signal generated at the 2B-ch side are added and the drive-control of the second slide transport part 5-2 is performed based on the added slide error signals.

In FIG. 1, the 2A-ch drive control part 4-2A generates the respective slide error signals from the tracking servo signal input from the 2B-ch drive control part 4-2B and the tracking servo signal generated by itself, and generates a slide servo signal based on the signal obtained by adding the slide error signals, and drive-controls the second slide transport part 5-2 based on the slide servo signal.

Thereby, the slide servo control appropriate for the case where simultaneous reproducing by the 1-head/2-ch configuration as shown in FIGS. 3A to 3D is performed may be realized, and the significant reduction of the reproducing performance like in the case where the slight servo control is performed based only on the slide error signal of one channel may be prevented.

The technique of the slide servo control suitable for the 1-head/2-ch configuration is also described in Japanese Patent Application No. 2008-164445 (JP-A-2010-009636).

Figure 4:
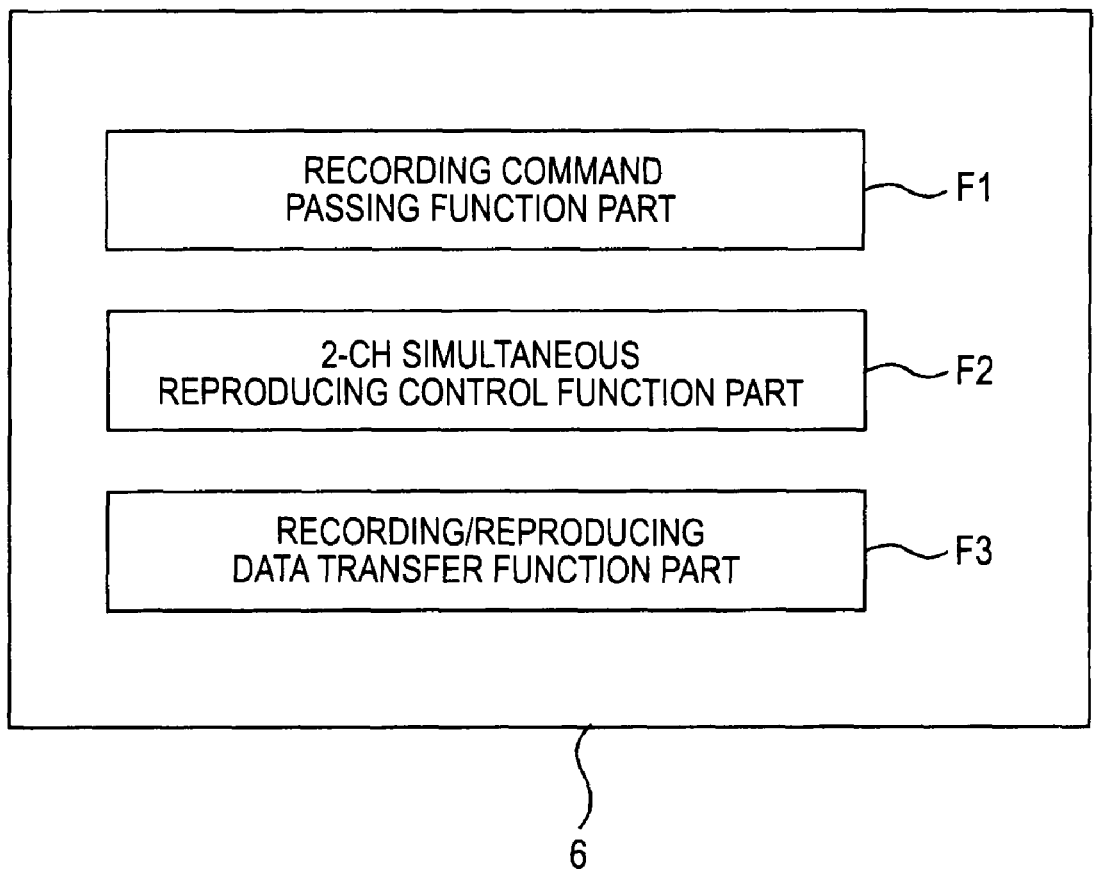
FIG. 4 shows processing performed by a bridge control part in the first embodiment in blocks by function.

FIG. 4 is a diagram for explanation of processing performed by the bridge control part 6 for realization of the simultaneous recording and reproducing technique as the first embodiment explained in FIGS. 3A to 3D.

In FIG. 4, the processing performed by the bridge control part 6 is shown in blocks by function.

As shown in FIG. 4, the bridge control part 6 has a recording command passing function part F1, a 2-ch simultaneous reproducing control function part F2, and a recording/reproducing data transfer function part F3.

First, the recording command passing function part F1 is a function part, when a recording command that instructs recording of data in the optical disc D is issued from the host computer 10 shown in FIG. 1, of passing the recording command to the 1-ch drive control part 4-1.

Further, the 2-ch simultaneous reproducing control function part F2 is a function part of controlling the 2A-ch drive control part 4-2A and the 2B-ch drive control part 4-2B, in response to that a reproducing command that instructs reproducing of certain data recorded in the optical disc D is issued by the host computer 10, so that the data instructed by the reproducing command may be reproduced by the 2-ch simultaneous reproducing operation as shown in FIGS. 3A to 3D.

Further, the recording/reproducing data transfer function part F3 is a function part of transferring recording data to the 1-ch drive control part 4-1 and transferring the reproducing data to the host computer 10.

Specifically, the recording data transferred from the host computer 10 side together with the recording command is transferred to the 1-ch drive control part 4-1, and the transfer of the reproducing data transferred from the 2A-ch drive control part 4-2A and the 2B-ch drive control part 4-2B with the 2-ch simultaneous reproducing operation to the host computer 10 side is performed.

[1-3. Summary of First Embodiment]

In the above described manner, in the first embodiment, a total of three channels of 1-ch, 2A-ch, 2B-ch are provided and, while recording in the optical disc D is performed by the 1-ch, 2-ch simultaneous reproducing of data recorded in the optical disc D is performed by the other 2A-ch, 2B-ch.

When the 2-ch simultaneous reproducing is performed in this manner, the reproducing rate is improved to nearly twice that in the case where reproducing is performed by one channel only. Specifically, in the case where simultaneous reproducing with the overtaking operation as shown in FIGS. 3A to 3D is performed, it has experimentally be proven that the reproducing rate is improved to about 1.9-times.

Here, in the case of BD, the innermost circumference position of the user data area on the optical disc D is defined to be 24 mm, and the outermost circumference is defined to be 58 mm. Accordingly, as described above, on the assumption of the CLV recording, when 2-ch simultaneous recording and reproducing of recording using one channel and reproducing using the other channel is simply performed, in the worst case where the innermost circumference is reproduced during recording of the outermost circumference, the reproducing rate is reduced to about 1/2.4 (58/24, about 41%) relative to the recording rate.

On the other hand, according to the embodiment of 2-ch simultaneous reproducing at the reproducing side, the reproducing rate may be improved to about 1.9-times, and thus, the reproducing rate that is 41% in the worst case may be improved to about 78%.

Therefore, according to the first embodiment, if the settable maximum recording rate is higher than the rate of the data to be recorded (video data in this example) by 28% (1/0.78) or more, the reproducing rate may be maintained equal to or more than 100% of the recording rate on the entire surface of the optical disc D, and, as a result, simultaneous recording and reproducing on the entire optical disc D may be realized.

Further, in some standards of recording and reproducing systems that handle so-called real-time data such as video data, recording of nonlinear data of file management information and the like in the innermost circumference part and the outermost circumference part is specified.

For example, in the case where those standards are employed, when recording of the real-time data between the radius of 28 mm to the radius of 53 mm is specified, the reduction of the reproducing rate is suppressed to about 1/1.9 (53/28) of the recording rate in the above described worst case, and, as a result, simultaneous recording and reproducing on the entire optical disc D may be realized also in this case by the technique of improving the reproducing rate (1.9-times improvement) according to the embodiment.

As described above, according to the first embodiment, since the data recorded in the optical disc D is simultaneously reproduced by plural channels, the reproducing rate is improved, and thereby, even under the condition that the CLV scheme is employed and the rate of the data to be recorded in the optical disc D is close to the settable maximum recording rate (CLV maximum recording rate) (for example, in the case where the recording rate is less than twice the rate of recording data), simultaneous recording and reproducing on the entire optical disc D that may not be realized in the case where 2-ch simultaneous recording and reproducing of simply assigning one channel to recording and the other channel to reproducing is performed can be realized.

Further, the first embodiment does not employ the technique of using one channel for both recording and reproducing like the technique disclosed in the above mentioned Patent Document 2, for example, and thus, has advantages that frequent seek operation is prevented and a buffer memory having relatively large capacity for securement of an amount of transferred data is not necessary.

2. Second Embodiment

[2-1. Overall Configuration of Optical Disc Drive Unit]

Subsequently, the second embodiment will be explained.

The second embodiment is to further improve the reproducing rate by performing multi-channel simultaneous recording by also providing plural channels in the optical head in charge of recording, and, using the spare time obtained thereby, allowing the optical head in charge of recording to also execute reproducing.

Figure 5:
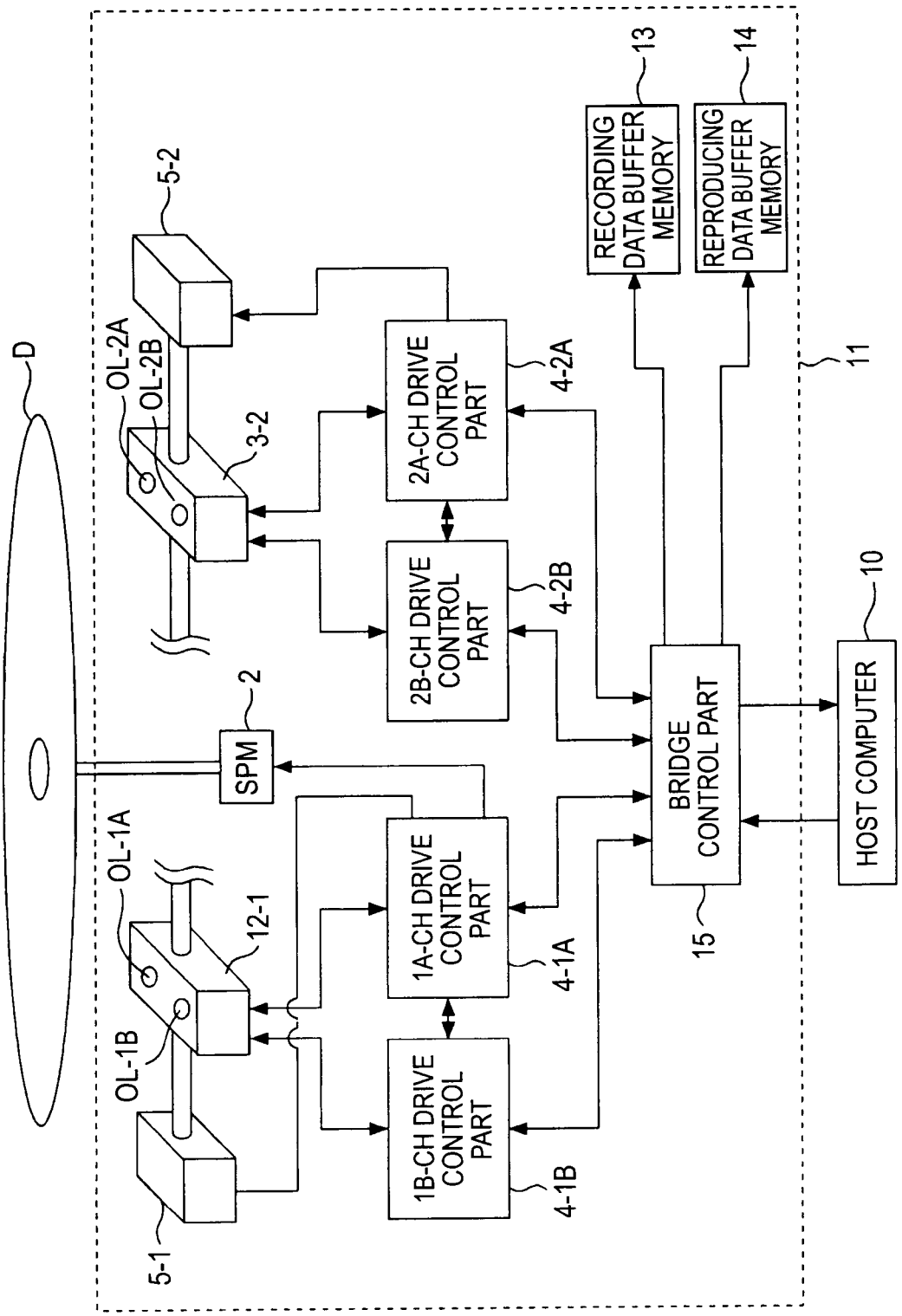
FIG. 5 is a diagram for explanation of an overall configuration within a recording and reproducing unit as the second embodiment.

FIG. 5 is a diagram for explanation of an overall configuration within an optical disc drive unit 11 as the second embodiment.

In FIG. 5, the same signs are assigned to the parts that have been already explained in the first embodiment, and their explanation will be omitted.

First, in the optical disc drive unit 11 of the second embodiment, in place of the first optical head 3-1 having only one channel in the first embodiment, a first optical head 12-1 having two channels is provided.

In the first optical head 12-1, an optical system having an objective lens OL-1A and an optical system having an objective lens OL-1B are provided. As shown in the drawing, these objective lenses OL-1A, OL-1B are located in positions shifted in the circumferential direction like the objective lenses OL-2A, OL-2B at the second optical head 3-2 side.

As explained in the first embodiment, within the optical system, a laser diode as a light source of a laser beam, a photodetector for receiving reflected light from the optical disc D, and a biaxial actuator that drives the objective lens OL in a tracking direction and a focus direction are provided.

Hereinafter, the channel of performing laser beam irradiation on the optical disc D by the optical system having the objective lens OL-1A is referred to as "1A-ch", and the channel of performing laser beam irradiation on the optical disc D by the optical system having the objective lens OL-1B is referred to as "1B-ch".

Further, in the optical disc drive unit 11, as drive control parts corresponding to the respective channels of 1A-ch, 1B-ch formed at the first optical head 12-1 side as described above, a 1A-ch drive control part 4-1A and a 1B-ch drive control part 4-1B in the drawing are provided.

Each of these 1A-ch drive control part 4-1A and 1B-ch drive control part 4-1B includes a configuration for independently performing recording and/or reproducing based on a light reception signal from the photodetector in each channel, including a servo control system based on the light reception signal from the photodetector provided in the optical system of the corresponding channel, a light emission drive system of the laser diode, a control part of a microcomputer or the like, for example, that makes control of them, etc.

Further, in the case of the second embodiment, at the 1A-ch side and the 1B-ch side, both recording and reproducing on the optical disc D are performed in the manner described later, and thus, in these drive control parts 4-1A, 4-1B, both a data recording processing system for performing data recording in the optical disc D by driving the laser diode to emit light in response to recording data and a data reproducing processing system for performing data reproducing based on a light reception signal from the photodetector are provided.

Here, slide servo control for the first optical head 12-1 is performed in the same manner as that of the slide servo control at the second optical head 3-2 side that has been explained. Specifically, in this case, the 1A-ch drive control part 4-1A side respectively generates slide error signals from a tracking servo signal input from the 1B-ch drive control part 4-1B and a tracking servo signal generated by itself, and generates a slide servo signal based on the signal obtained by adding the slide error signals, and drive-controls the first slide transport part 5-1 based on the slide servo signal. Thereby, the slide servo control suitable for the 1-head/2-ch configuration is also realized at the first optical head 12-1 side.

Further, in the optical disc drive unit 11 of the second embodiment, a bridge control part 15 that realizes simultaneous recording and reproducing operation as the second embodiment explained as below by performing control for the drive control parts 4-1A, 4-1B, and additionally, the drive control part 4-2A, 4-2B is provided.

As shown in the drawing, for the bridge control part 15, a recording data buffer memory 13 and a reproducing data buffer memory 14 are provided. In the recording data buffer memory 13, recording data to be transferred from the host computer 10 provided outside of the optical disc drive unit 11 is buffered (temporarily accumulated). Further, in the reproducing data buffer memory 14, reproducing data to be transferred from the channel in charge of reproducing is buffered.

[2-2. Simultaneous Recording and Reproducing Technique of Second Embodiment]

Figure 6:
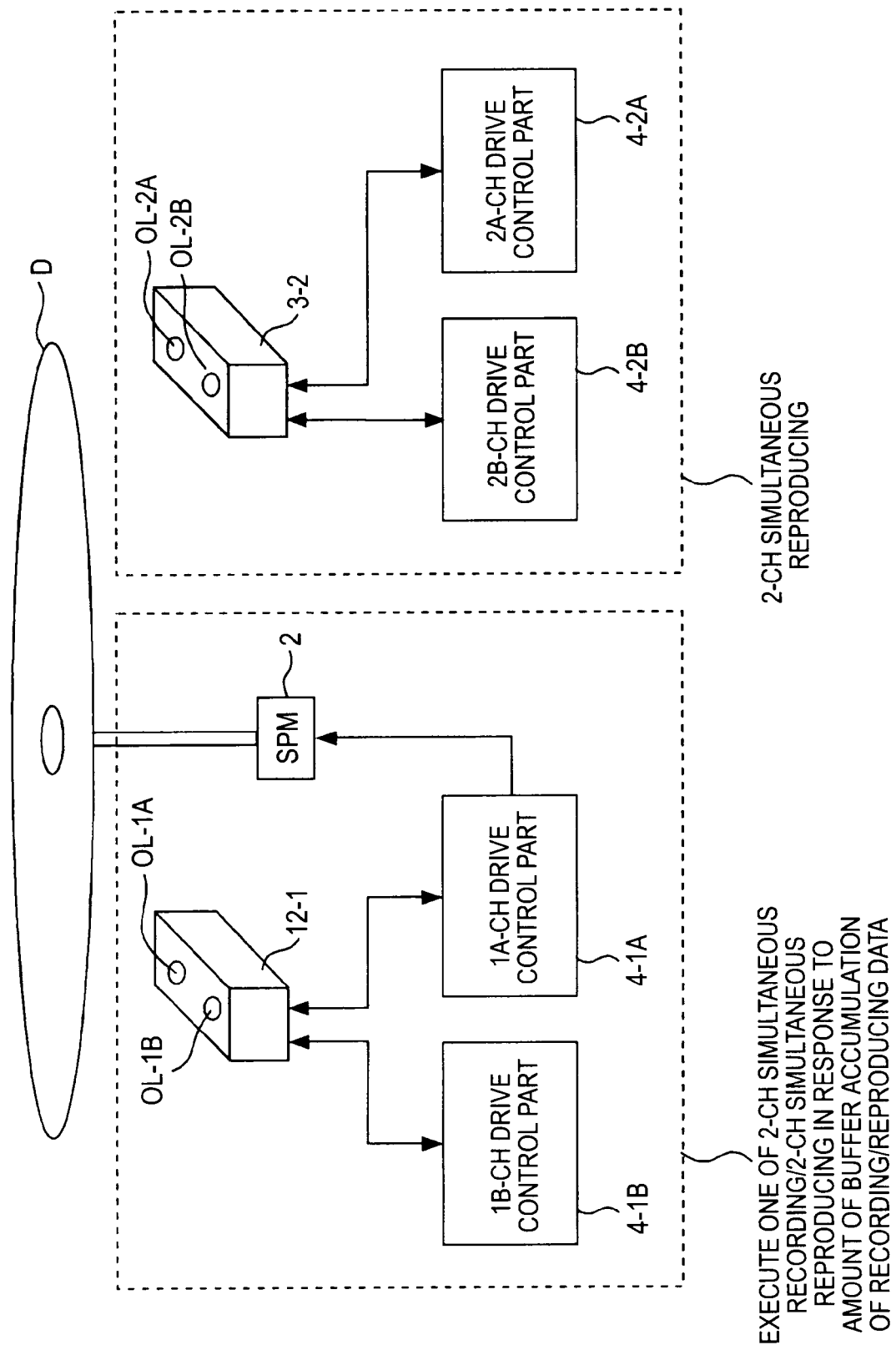
FIG. 6 is a diagram for explanation of a simultaneous recording and reproducing technique as the second embodiment.

FIG. 6 is a diagram for explanation of a simultaneous recording and reproducing technique as the second embodiment realized by the optical disc drive unit 11 shown in FIG. 5.

The second embodiment is similar as the first embodiment in that the second optical head 3-2 side is allowed to execute only 2-ch simultaneous reproducing.

The second embodiment is characterized in that the operation at the first optical head 12-1 side in charge of recording is appropriately switched between 2-ch simultaneous recording/2-ch simultaneous reproducing in response to the amounts of accumulated data in the recording data buffer memory 13 and the reproducing data buffer memory 14 shown in FIG. 5.

Here, 2-ch simultaneous recording is performed by overtaking method like that in the 2-ch simultaneous reproducing that has been explained in the first embodiment. That is, it may be understood that reproducing in the above explained explanation of FIGS. 3A to 3D is replaced by recording in the 2-ch simultaneous recording.

For confirmation, also in the second embodiment, the CLV scheme is employed for the disc rotation control scheme, and the number of revolutions of the spindle motor 2 at recording is controlled to make the constant linear velocity in response to the recording position. In this example, the rotation control of the spindle motor 2 is performed by the 1A-ch drive control part 4-1A.

Here, as described above, in the second embodiment, the state of the first optical head 12-1 performing the 2-ch simultaneous recording (that is, the state of 2-ch simultaneous recording and 2-ch simultaneous reproducing) and the state of performing the 2-ch simultaneous reproducing (the state of 4-ch simultaneous reproducing) are appropriately switched.

Since the 2-ch simultaneous recording is performed, the recording rate in this case is improved to nearly twice (about 1.9-times) compared to that in the case of the first embodiment.

Further, in the case where the first optical head 12-1 side performs the 2-ch simultaneous reproducing and 4-ch simultaneous reproducing in total is executed, the reproducing rate of 156% may be secured in the worst case in which the reproducing rate is 78% in the first embodiment. This means that room for 56% is generated even if the rate of the video data to be recorded is the same as the CLV recording rate (recording rate at 1-ch recording).

The second embodiment further improves the reproducing rate compared to the case of the first embodiment by allowing the first optical head 12-1 to execute reproducing using spare time obtained at the first optical head 12-1 side by performing the above described 2-ch simultaneous recording.

Here, in the second embodiment, in nearly a half of the time (1/1.9) of the time necessary for the case of typical 1-ch recording, reproducing at least at the rate of 156% of the CLV recording rate may be performed. That is, data reproducing in this case may be performed at least at the reproducing rate of 78% or more by the second optical head 3-2 side alone in nearly the half of the time and, in the rest of nearly the half of the time, the data reproducing may be performed at least at the reproducing rate of 156% or more by 4-ch simultaneous reproducing. Therefore, the average reproducing rate in this case may be secured at least at about 1.17% ((78%+156%)/2).

As understood from that, according to the second embodiment, without the restriction necessary in the first embodiment, that is, the restriction that the recording rate is equal to or more than 28% of the rate of recording data or the recording and reproducing region of the real-time data is 28 mm to 53 mm, the reproducing rate may constantly be 100% or more relative to the recording rate (obviously, on the assumption that the recording rate is at least equal to or more than the rate of recording data). That is, without these restrictions, the simultaneous recording and reproducing on the entire surface of the optical disc D may be realized.

-First Technique-

In the second embodiment, switching between the state of the first optical head 12-1 performing the 2-ch simultaneous recording and the state of performing the 2-ch simultaneous reproducing is performed in response to the amounts of buffer accumulation.

As examples of the technique of switching recording/reproducing in response to the amounts of buffer accumulation, in this example, a technique of switching based only on the amount of accumulated data of the recording data buffer memory 13 (hereinafter, referred to as "first technique") and a technique of switching based only on the amount of accumulated data of the reproducing data buffer memory 14 (hereinafter, referred to as "second technique") are exemplified.

As below, first, the former technique, that is, the first technique of switching between 2-ch simultaneous recording/2-ch simultaneous reproducing at the first optical head 12-1 side based only on the amount of accumulated data of the recording data buffer memory 13 will be explained.

Figure 7:
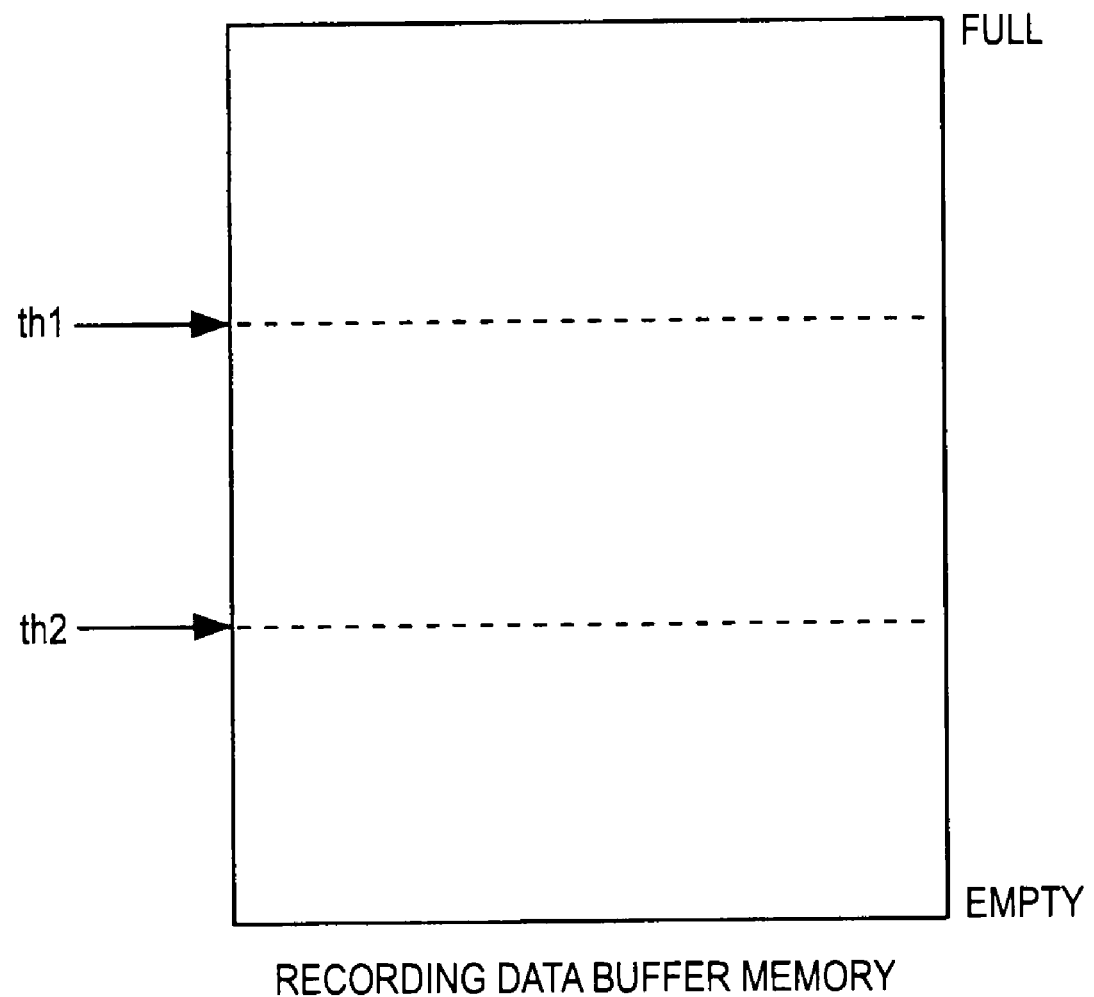
FIG. 7 is a diagram for explanation of threshold values set for a recording data buffer memory in the first technique of the second embodiment.

FIG. 7 shows threshold values to be set for the recording data buffer memory 13 when the first technique is employed.

As shown in FIG. 7, in the first technique, two threshold values th of a threshold value th1 and a threshold value th2 are set for the recording data buffer memory 13. As shown in the drawing, the relation between the two threshold values th is threshold value th1>threshold value th2.

In the first technique, using the two threshold values th1, th2 set for the recording data buffer memory 13, switching between the recording/reproducing operations at the first optical head 12-1 side is performed in the following manner.

First, as described above, in the second embodiment, since data recording in the optical disc D is performed by 2-ch simultaneous recording, the amount of accumulated data of the recording data buffer memory 13 gradually decreases with time.

Therefore, in the case where the 2-ch simultaneous recording is continued, at a certain point, the amount of accumulated data of the recording data buffer memory 13 decreases to the threshold value th2 or less.

In response to that the amount of accumulated data of the recording data buffer memory 13 becomes the threshold value th2 or less, the first optical head 12-1 is allowed to execute 2-ch simultaneous reproducing. That is, the state is changed to 4-ch simultaneous reproducing.

Here, when the 4-ch simultaneous reproducing is performed and the recording operation in the optical disc D is interrupted, the number of revolutions of the spindle motor 2 is maintained at the number of revolutions in response to the radial position where recording has been interrupted.

In the above described manner, in response to that the 4-ch simultaneous reproducing is performed and data recording in the optical disc D is interrupted, the recording data is gradually accumulated in the recording data buffer memory 13, and then, at a certain point, the amount of accumulated data in the recording data buffer memory 13 rises to the threshold value th1 or more.

In response to that the amount of accumulated data in the recording data buffer memory 13 has become to the threshold value th1 or more, the first optical head 12-1 is allowed to execute 2-ch simultaneous recording. In the state that the 2-ch simultaneous recording is executed, the amount of accumulated data of the recording data buffer memory 13 gradually decreases as described above, and the amount of accumulated data of the recording data buffer memory 13 decreases to the threshold value th2 or less again at a certain point.

As understood from the above explanation, in the first technique, with respect to the amount of accumulated data of the recording data buffer memory 13, switching between the recording/reproducing operations is performed to obtain the 2-ch simultaneous recording and 2-ch simultaneous reproducing state by allowing the first optical head 12-1 to execute 2-ch simultaneous recording if the amount is the threshold value th2 or less, and obtain the 4-ch simultaneous reproducing state by allowing the first optical head 12-1 to execute 2-ch simultaneous reproducing if the amount is the threshold value th1 or more.

As a result of the switching between the recording/reproducing of the first optical head 12-1 based on the threshold value th1 and the threshold value th2, simultaneous recording and reproducing operation on the optical disc D may be performed while occurrence of overflow of recording data is prevented.

For confirmation, in the case where the technique as the second embodiment appropriately using the optical head in charge of recording also for reproducing is employed as described above, the seek operation for moving the optical head in charge of recording to a requested reproducing position occurs. In the second embodiment, capacities of the recording data buffer memory 13 and the reproducing data buffer memory 14 should be set to capacities large enough in consideration of the time taken for the seek operation.

Figure 8:
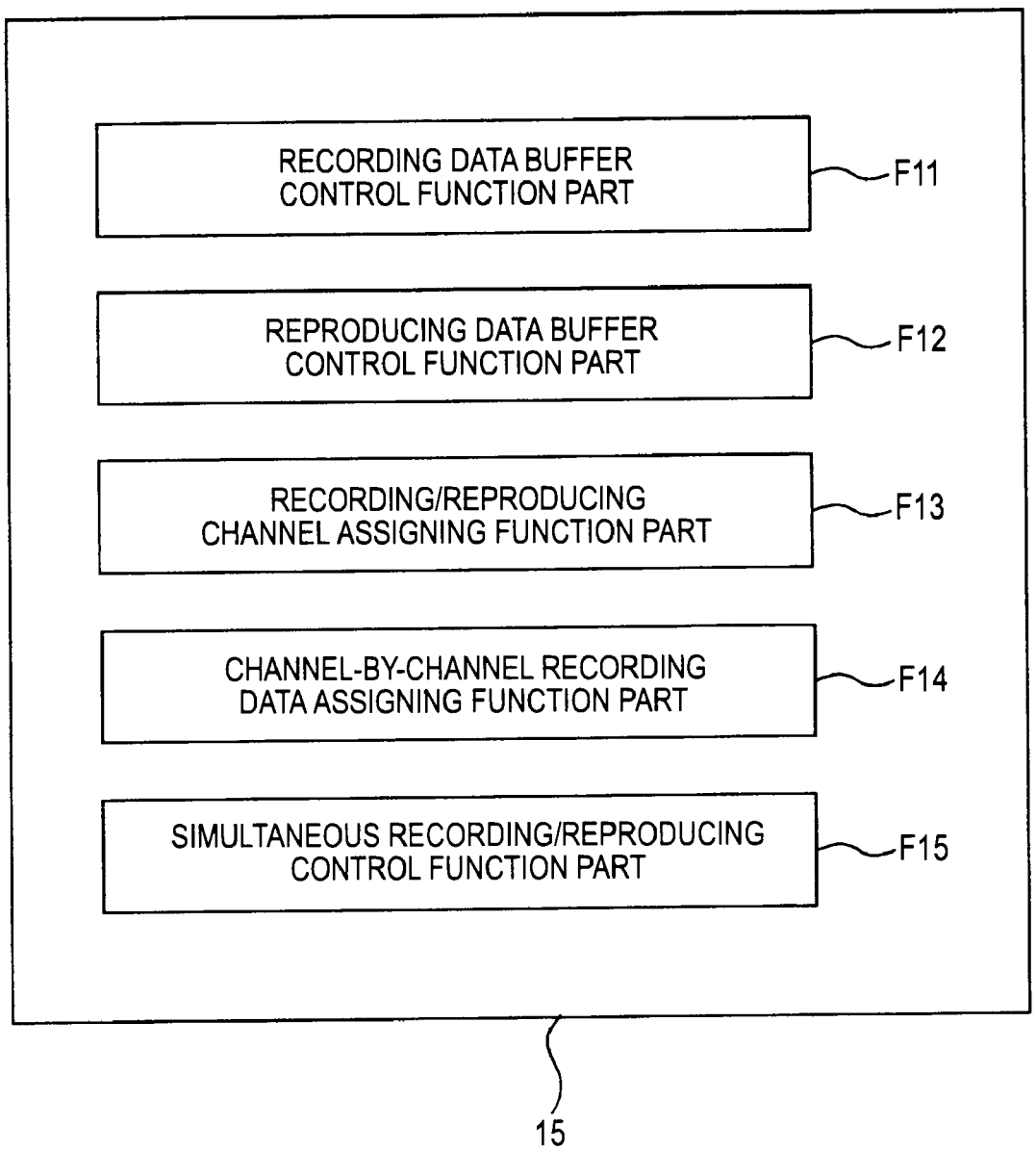
FIG. 8 shows processing performed by a bridge control part in the second embodiment in blocks by function.

FIG. 8 is a diagram for explanation of processing to be performed by the bridge control part 15 for realization of the simultaneous recording and reproducing operation as the first technique explained as above.

Also, in FIG. 8, like in FIG. 4, the processing performed by the bridge control part 15 is shown in blocks by function.

As shown in FIG. 8, the bridge control part 15 in this case has a recording data buffer control function part F11, a reproducing data buffer control function part F12, a recording/reproducing channel assigning function part F13, a channel-by-channel recording data assigning function part F14, and a simultaneous recording/reproducing control function part F15.

The recording data buffer control function part F11 is a function part of performing control so that the recording data to be supplied from the host computer 10 shown in FIG. 5 may temporarily be accumulated in the recording data buffer memory 13.

Further, the reproducing data buffer control function part F12 is a function part of performing control so that the reproducing data to be appropriately transferred from the respective channels of 1A-ch, 1B-ch, 2A-ch, 2B-ch may temporarily be accumulated in the reproducing data buffer memory 14 and the accumulated reproducing data may appropriately be transferred to the host computer 10 side.

The recording/reproducing channel assigning function part F13 is a function part of performing control for allowing the first optical head 12-1 to execute 2-ch simultaneous recording/2-ch simultaneous reproducing based on the amount of accumulated data of the recording data buffer memory 13 and the threshold value th1 and the threshold value th2 as described above in the case of the first technique.

Figure 9:
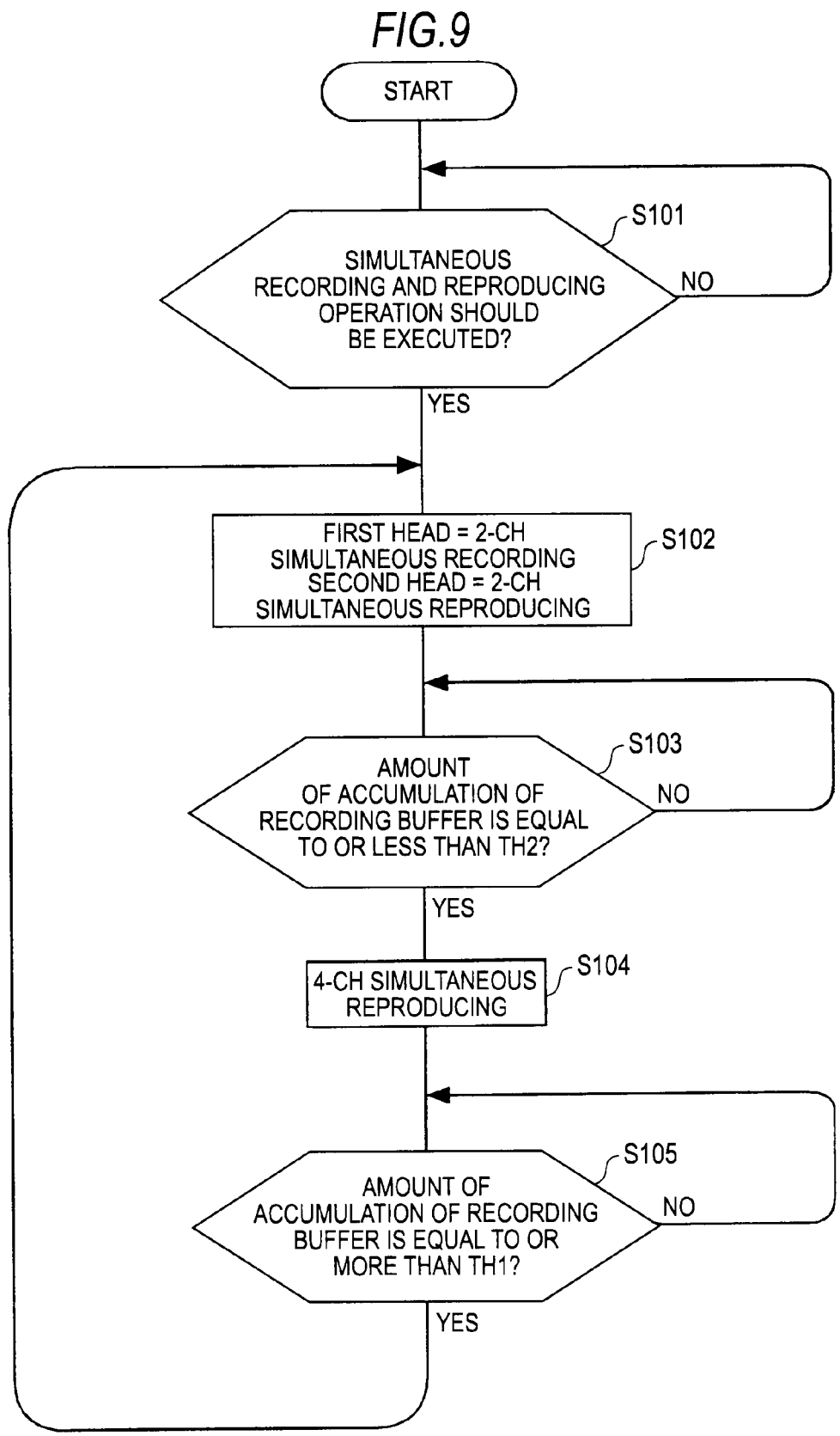
FIG. 9 is a flowchart showing a specific procedure of processing to be executed for realization of assignation of recording/reproducing channels in the case of the first technique of the second embodiment.

Specifically, the bridge control part 15 in this case execute the processing as shown in the next FIG. 9 for realization of the functional operation as the recording/reproducing channel assigning function part F13.

FIG. 9 is a flowchart showing a specific procedure of processing to be executed for realization of recording/reproducing channel assigning function in the case of the first technique.

In FIG. 9, first, at step S101, the part waits until the status in which the simultaneous recording and reproducing operation should be executed.

That is, processing of determining whether a predetermined condition on which the recording operation and the reproducing operation should simultaneously be executed on the optical disc D, for example, such that the recording instruction of video data in the optical disc D and the reproducing instruction of the data recorded on the optical disc are simultaneously given by the host computer 10 shown in FIG. 5 is satisfied or not is repeatedly executed until a positive result is obtained.

Then, if the simultaneous recording and reproducing should be performed, the process moves to step S102, and processing for allowing the first optical head 12-1 side to execute 2-ch simultaneous recording and allowing the second optical head 3-2 side to execute 2-ch simultaneous reproducing is performed.

At the subsequent step S103, the part waits until the amount of accumulated data of the recording data buffer memory 13 becomes the threshold value th2 or less.

Then, if the amount of accumulated data of the recording data buffer memory 13 becomes the threshold value th2 or less, at step S104, 4-ch simultaneous reproducing, i.e., the processing for allowing the first optical head 12-1 to execute 2-ch simultaneous reproducing and allowing the second optical head 3-2 to execute 2-ch simultaneous reproducing is performed.

At the subsequent step S105, the part waits until the amount of accumulated data of the recording data buffer memory 13 becomes the threshold value th1 or more.

If the amount of accumulated data of the recording data buffer memory 13 becomes the threshold value th1 or more, the process returns to step S102, and processing for allowing the first optical head 12-1 side to execute 2-ch simultaneous recording and allowing the second optical head 3-2 side to execute 2-ch simultaneous reproducing is performed.

The explanation is returned to FIG. 8.

The channel-by-channel recording data assigning function part F14 is a function part of assigning data to be recorded respectively to the 1A-ch drive control part 4-1A and the 1B-ch drive control part 4-1B in response to the case where the first optical head 12-1 performs 2-ch simultaneous recording.

Specifically, according to the overtaking operation that has been explained in FIGS. 3A to 3D, data to be recorded in the tracks 1, 2, 7, 8, 9, 10 . . . may be assigned to the A-ch side and data to be recorded in the tracks 3, 4, 5, 6, 11, 12 . . . may be assigned to the B-ch side (see FIG. 3D).

As described above, at 2-ch simultaneous recording, the data to be recorded in the respective channels follow the predetermined regularity determined depending on how the overtaking recording is performed. Therefore, the channel-by-channel recording data assigning function part F14 respectively assigns the recording data accumulated within the recording data buffer memory 13 to the 1A-ch drive control part 4-1A and the 1B-ch drive control part 4-1B according to the information representing the regularity determined in response to the employed technique of overtaking recording.

The simultaneous recording/reproducing control function part F15 is a function part of performing control so that 2-ch simultaneous recording or 2-ch simultaneous reproducing with the overtaking operation as shown in FIGS. 3A to 3D may be executed. Specifically, according to the predetermined technique of overtaking recording or overtaking reproducing, instructions of overtaking times to the 1A-ch drive control part 4-1A, the 1B-ch drive control part 4-1B, the 2A-ch drive control part 4-2A, the 2B-ch drive control part 4-2B or the like are given.

-Second Technique-

Figure 10:
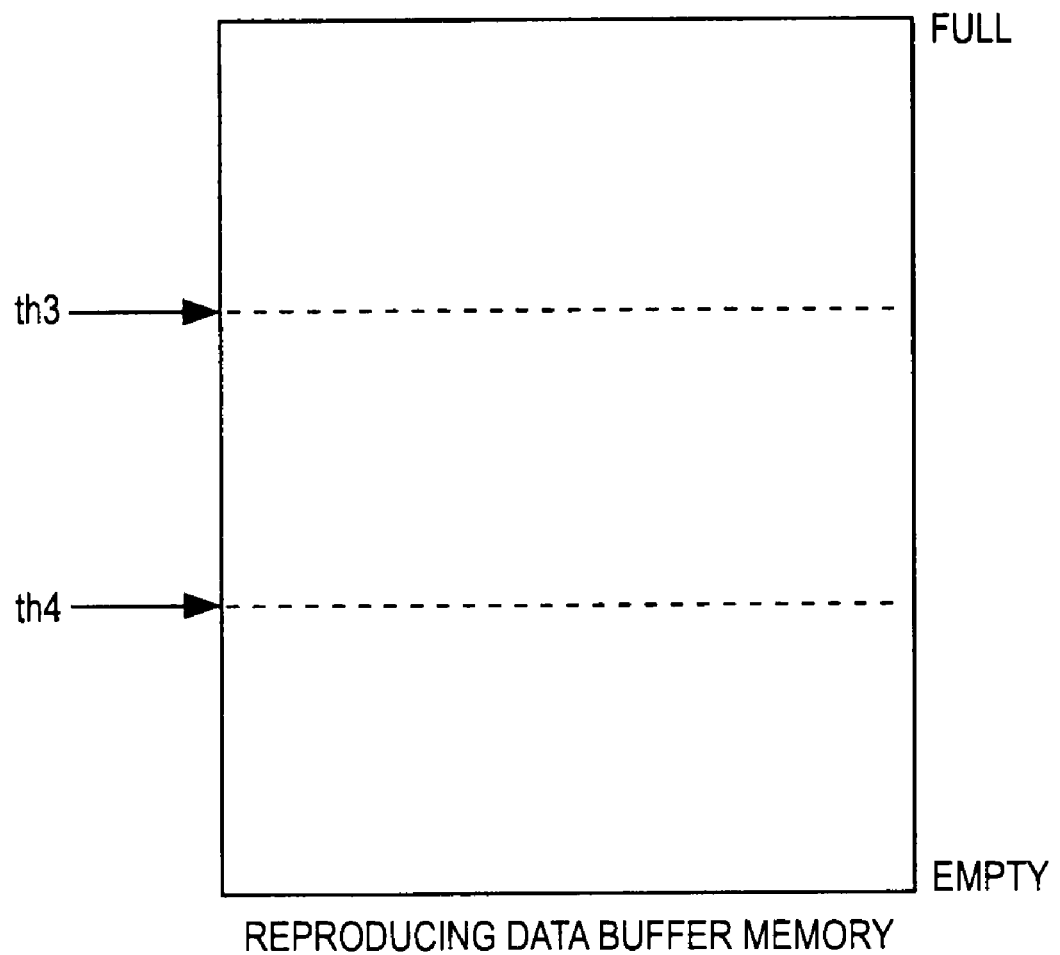
FIG. 10 is a diagram for explanation of threshold values set for a reproducing data buffer memory in the second technique of the second embodiment.

FIG. 10 shows threshold values set for the reproducing data buffer memory 14 in the case where the second technique, that is, the technique of switching between 2-ch simultaneous recording/2-ch simultaneous reproducing at the first optical head 12-1 side is performed based only on the amount of accumulated data of the reproducing data buffer memory 14 is employed.

In the second technique as shown in FIG. 10, a threshold value th3 and a threshold value th4 are set for the reproducing data buffer memory 14. As shown in the drawing, the relation between the two threshold values th is threshold value th3>threshold value th4.

In the second technique, using the threshold values th3, th4, switching between the recording/reproducing operations at the first optical head 12-1 side is performed in the following manner.

First, in the state in which 2-ch simultaneous recording is executed at the first optical head 12-1 side, that is, only the second optical head 3-2 performs reproducing, in the case of the above described worst case, the reproducing rate is 78% relative to the CLV recording rate, and the amount of accumulated data of the reproducing data buffer memory 14 gradually decreases with time.

Therefore, in the case where the 2-ch simultaneous recording is continued, the amount of accumulated data of the reproducing data buffer memory 14 decreases to the threshold value th4 or less at a certain point.

In response to that the amount of accumulated data of the reproducing data buffer memory 14 decreases to the threshold value th4 or less, the first optical head 12-1 is allowed to execute 2-ch simultaneous reproducing for changing the state into 4-ch simultaneous reproducing.

By the 4-ch simultaneous reproducing, the reproducing rate of 156% is secured even in the worst case, and the reproducing data will gradually be accumulated in the reproducing data buffer memory 14.

Then, at a certain point, the amount of accumulated data of the reproducing data buffer memory 14 rises to the threshold value th3 or more.

In response to that the amount of accumulated data of the reproducing data buffer memory 14 has become the threshold value th3 or more, the first optical head 12-1 is allowed to execute 2-ch simultaneous recording for changing the state into 2-ch simultaneous recording and 2-ch simultaneous reproducing.

In the state of 2-ch simultaneous recording and 2-ch simultaneous reproducing, the amount of accumulated data of the reproducing data buffer memory 14 gradually decreases as described above, and the amount of accumulated data of the reproducing data buffer memory 14 becomes lower to the threshold value th4 or less at a certain point.

In this manner, in the second technique, if the amount of accumulated data of the reproducing data buffer memory 14 is the threshold value th3 or more, the first optical head 12-1 is allowed to execute 2-ch simultaneous recording so that the state of 2-ch simultaneous recording and 2-ch simultaneous reproducing may be obtained, and, if the amount is the threshold value th4 or less, the first optical head 12-1 is allowed to execute 2-ch simultaneous reproducing so that the state of 4-ch simultaneous reproducing may be obtained.

As a result of the switching between the recording/reproducing of the first optical head 12-1 based on the threshold value th3 and the threshold value th4, simultaneous recording and reproducing operation on the optical disc D may be performed while occurrence of underflow of recording data is prevented.

FIG. 11 is a flowchart showing a specific procedure of processing to be executed by the bridge control part 15 for realization of the simultaneous recording and reproducing technique as the second technique.

Also, in FIG. 11, like in FIG. 9, the specific procedure of processing to be executed by the bridge control part 15 as the recording/reproducing channel assigning function part F13 shown in FIG. 8 is shown.

In the second technique, only the processing of the recording/reproducing channel assigning function part F13 is different but the other function parts F are the same as those in the case of the first technique, and another explanation by illustration will be omitted.

In FIG. 11, at step S201, like at the above described step S101, the part waits until the status in which the simultaneous recording and reproducing operation should be executed.

Then, if the simultaneous recording and reproducing should be performed, the process moves to step S202, and processing for allowing the first optical head 12-1 side to execute 2-ch simultaneous recording and allowing the second optical head 3-2 side to execute 2-ch simultaneous reproducing is performed.

At the subsequent step S203, the part waits until the amount of accumulated data of the reproducing data buffer memory 14 becomes the threshold value th4 or less.

Then, if the amount of accumulated data of the reproducing data buffer memory 14 becomes the threshold value th4 or less, at step S204, 4-ch simultaneous reproducing, i.e., the processing for allowing the first optical head 12-1 to execute 2-ch simultaneous reproducing and allowing the second optical head 3-2 to execute 2-ch simultaneous reproducing is performed.

At the subsequent step S205, the part waits until the amount of accumulated data of the reproducing data buffer memory 14 becomes the threshold value th3 or more.

If the amount of accumulated data of the reproducing data buffer memory 14 becomes the threshold value th3 or more, the process returns to step S202, and processing for allowing the first optical head 12-1 side to execute 2-ch simultaneous recording and allowing the second optical head 3-2 side to execute 2-ch simultaneous reproducing is performed.

3. MODIFIED EXAMPLES

Heretofore, the respective embodiments of the invention have been explained, however, the invention should not be limited to the above described specific examples.

For example, in the above explanation, the optical head exclusive for reproducing has two channels, however, two channels for reproducing may be mounted in the separate optical heads. That is, in this case, two heads and two channels are used exclusive for reproducing.

Further, in the second embodiment, two channels are provided at the optical head side in charge of recording, however, those channels in charge of recording may be mounted in the separate optical heads to form a 3-head/4-ch configuration.

Alternatively, in the case of the second embodiment, a 4-head/4-ch configuration in which four channels are respectively mounted on the independent optical heads may be employed.

Furthermore, in the second embodiment (the technique using plural channels for recording and appropriately using the channels in charge of recording also for the reproducing side), the number of channels may be four or more.

For example, if a 4-head/8-ch configuration is employed, two heads and four channels are used for recording and two heads and four channels are used exclusive for reproducing, also the two heads and the four channels in charge of recording may appropriately be used for reproducing, and the same advantage as that explained in the second embodiment may be obtained.

Moreover, in the second embodiment, recording/reproducing of the optical head in charge of recording is switched based only on one of the amount of accumulated data of the recording data buffer memory 13 or the amount of accumulated data of the reproducing data buffer memory 14, however, recording/reproducing of the optical head in charge of recording may be switched based on both amounts of temporarily accumulated recording data and reproducing data.

Alternatively, for the switching between recording/reproducing of the optical head in charge of recording, not only based on the amounts of temporarily accumulated recording data and reproducing data but also, for an example, a technique of performing the switching so that the ratio between the time for recording and the time for reproducing by the optical head in charge of recording may be a predetermined ratio (nearly fifty-fifty) may be employed.

Or, a technique of obtaining a prediction value of the average reproducing rate within the execution period of simultaneous recording and reproducing from the positional relation between the region to be recorded and the region to be reproduced and setting switching times of recording/reproducing in response to the difference of the prediction value from the rate of the recording data (×1) may be employed.

As described above, as triggers for switching recording/reproducing of the optical head in charge of recording, various techniques other than those based on the amounts of accumulated data of the buffer memories may be employed.

The present application contains subject matter related to that disclosed in Japanese Priority Patent Application JP 2009-261090 filed in the Japan Patent Office on Nov. 16, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing unit comprising:
a first optical head having at least one route of laser beam irradiation system that irradiates an optical disc recording medium with a laser beam;
a second optical head having plural routes of laser beam irradiation systems that irradiate the optical disc recording medium with laser beams; and
a control part that performs control of, while allowing the laser beam irradiation system that the first optical head has to execute recording of information in the optical disc recording medium, allowing the plural laser beam irradiation systems that the second optical head has to execute simultaneous reproducing of the information recorded in the optical disc recording medium.

2. The recording and reproducing unit according to claim 1, wherein the first optical head has only one route of the laser irradiation system, the second optical head has two routes of the laser irradiation systems, and the control part performs control of, while allowing the laser beam irradiation system that the first optical head has to execute recording of information in the optical disc recording medium, allowing the two routes of the laser beam irradiation systems that the second optical head has to execute simultaneous reproducing of the information recorded in the optical disc recording medium.

3. The recording and reproducing unit according to claim 1, wherein the first optical head and the second optical head respectively have two routes of the laser irradiation systems, and the control part performs control so that, while simultaneous reproducing of the information recorded in the optical disc recording medium is executed by the two routes of the laser irradiation systems that the second optical head has, simultaneous recording of information in the optical disc recording medium and simultaneous reproducing of the information recorded in the optical disc recording medium may be executed by appropriate switching by the two routes of the laser irradiation systems that the first optical head has.

4. The recording and reproducing unit according to claim 3, further comprising:

a recording data temporarily accumulating part that temporarily accumulates recording data in the optical disc recording medium; and a reproducing data temporarily accumulating part that temporarily accumulates reproducing data reproduced from the optical disc recording medium, wherein the control part performs control so that switching between the simultaneous recording and the simultaneous reproducing by the two routes of the laser irradiation systems that the first optical head has based on an amount of accumulated data in the recording data temporarily accumulating part or the reproducing data temporarily accumulating part.

5. The recording and reproducing unit according to claim 4, wherein the control part respectively determines whether the amount of accumulated data in the recording data temporarily accumulating part is equal to or more than a first threshold value or not and whether the amount is equal to or less than a second threshold value smaller than the first threshold value or not, if the control part determines that the amount of accumulated data is equal to or more than the first threshold value, the control part performs control so that the simultaneous recording may be performed by the two routes of the laser irradiation systems that the first optical head has, and, if the control part determines that the amount of accumulated data is equal to or less than the second threshold value, the control part performs control so that the simultaneous reproducing may be performed by the two routes of the laser irradiation systems that the first optical head has.

6. The recording and reproducing unit according to claim 4, wherein the control part respectively determines whether the amount of accumulated data in the reproducing data temporarily accumulating part is equal to or more than a third threshold value or not and whether the amount is equal to or less than a fourth threshold value smaller than the third threshold value or not, if the control part determines that the amount of accumulated data is equal to or more than the third threshold value, the control part performs control so that the simultaneous recording may be performed by the two routes of the laser irradiation systems that the first optical head has, and, if the control part determines that the amount of accumulated data is equal to or less than the fourth threshold value, the control part performs control so that the simultaneous reproducing may be performed by the two routes of the laser irradiation systems that the first optical head has.

7. The recording and reproducing unit according to claim 2 or 3, wherein the two routes of the laser irradiation systems perform the simultaneous reproducing by driving objective lenses that the systems respectively have to alternately overtake their reproducing positions in a radial direction of the optical disc recording medium.

8. The recording and reproducing unit according to claim 3, wherein the two routes of the laser irradiation systems perform the simultaneous recording by driving objective lenses that the systems respectively have to alternately overtake their recording positions in a radial direction of the optical disc recording medium.

9. The recording and reproducing unit according to claim 1, further comprising:

a rotational driving part that rotationally drives the optical disc recording medium; and a rotational control part that controls the rotational driving part to rotationally drive the optical disc recording medium having a constant linear velocity in response to the recording position by the first optical head.

10. A recording and reproducing method of performing recording and reproducing on an optical disc recording medium using a first optical head having at least one route of laser beam irradiation system that irradiates the optical disc recording medium with a laser beam and a second optical head having plural routes of laser beam irradiation systems that irradiate the optical disc recording medium with laser beams, the method comprising the step of:

while executing recording of information in the optical disc recording medium by the laser beam irradiation system that the first optical head has, executing simultaneous reproducing of the information recorded in the optical disc recording medium by the plural laser beam irradiation systems that the second optical head has.

* * * * *